R. 'R' DEBACHER.
PERPETUAL CALENDAR.
APPLICATION FILED NOV. 28, 1914.

1,164,266.

Patented Dec. 14, 1915.

Witnesses:
Harry B. Fleischer
F. George Barry

Inventor:
Robert R. Debacher
by his attorney

UNITED STATES PATENT OFFICE.

ROBERT 'R' DEBACHER', OF HOBOKEN, NEW JERSEY.

PERPETUAL CALENDAR.

1,164,266.  Specification of Letters Patent.  Patented Dec. 14, 1915.

Application filed November 28, 1914. Serial No. 874,426.

*To all whom it may concern:*

Be it known that I, ROBERT 'R' DEBACHER', a citizen of the United States, and resident of Hoboken, in the county of Hudson and State of New Jersey, have invented a new and useful Improvement in Perpetual Calendars, of which the following is a specification.

This invention relates to perpetual calendars, with the object in view of providing improvements in the form, construction and arrangement of the several parts whereby there is promoted simplicity, (with its attendant cheapness), compactness, neat appearance, and ease and precision of operation.

Figure 1:
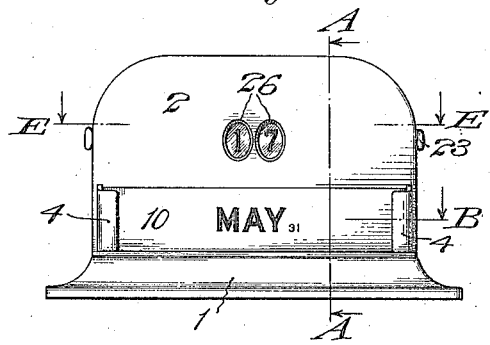
Figures 2, 3:
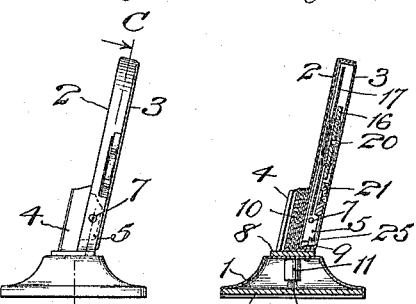
Figure 4:
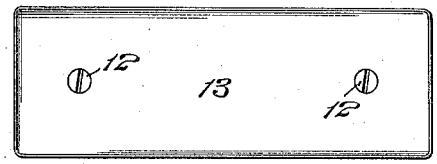
Figures 7, 8:
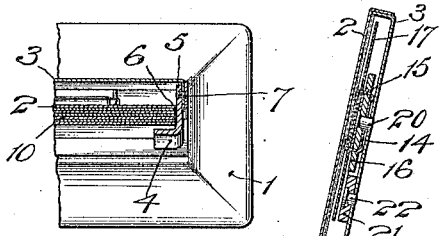
Figures 5, 9, 10:
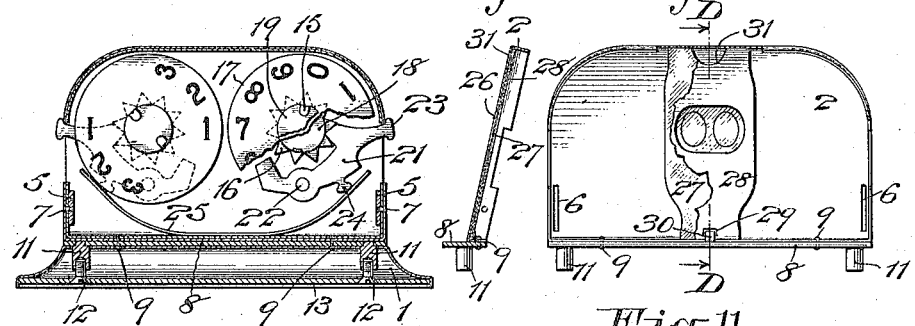
Figure 6:
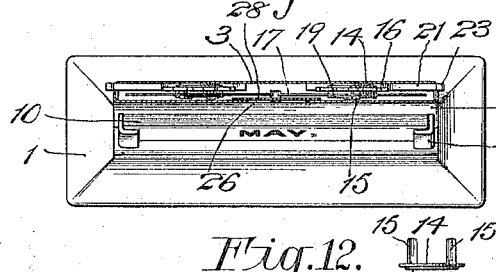
Figure 11:
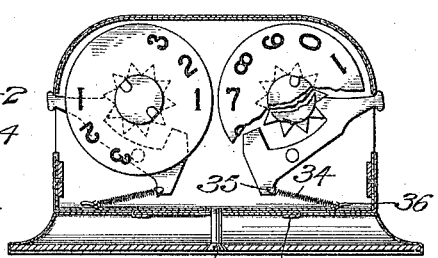
Figures 12, 13:
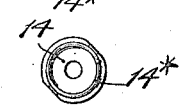

A practical embodiment of my invention is represented in the accompanying drawings, in which, Figure 1 represents a front view of the calendar in assembled form, Fig. 2 represents a side view of the same, Fig. 3 represents a section taken in the plane of the line A—A of Fig. 1, looking in the direction of the arrows, Fig. 4 represents a bottom view. Fig. 5 represents a vertical section taken in the plane of the line C—C of Fig. 2, looking in the direction of the arrows, Fig. 6 represents a horizontal section taken in the plane of the line E—E of Fig. 1, looking in the direction of the arrows, Fig. 7 represents an enlarged detail horizontal section taken in the plane of the line B of Fig. 1, looking in the direction of the arrow. Fig. 8 represents an enlarged detail vertical section taken in the plane of the line A—A of Fig. 1, looking in the direction of the arrows, Fig. 9 represents a rear view, partly broken away, of the front member of the calendar, Fig. 10 represents a vertical section taken in the plane of the line D—D of Fig. 9, looking in the direction of the arrows, Fig. 11 represents a view similar to Fig. 5, showing a modified form, Fig. 12 represents a detail side view of one of the disks for supporting the indicator cards, and Fig. 13 represents an inverted plan view thereof.

Referring to the preferred form shown in Figs. 1 to 10, 12 and 13, the calendar structure comprises a base portion, denoted by 1, which may conveniently be composed of stamped sheet metal and have some appropriate form adapted to act as a support for the superstructure. In the present case, the base is shown as substantially oblong with a reduced upper platform or support for the other portions.

The body of the calendar comprises a front member, denoted by 2, and a back member, denoted by 3. These members may both be stamped from an appropriate sheet metal. They are flanged around their edges, which flanges project at right angles to the main portions thereof, and one of the members is made sufficiently smaller than the other so that it may be received within the latter with the peripheral flanges overlapping and abutting. In the present instance the rear member 3 is shown as fitted in the front member 2. This arrangement serves to provide a better appearance to the front of the calendar. The calendar also includes a pair of brackets 4, fitted to receive and hold cards, such as strips of celluloid, having the months of the year printed thereon. These brackets consist of angle pieces bent from sheet metal, and are each provided with ears 5, adapted to pass rearwardly through slits 6 fashioned in the front member 2 near the edges and at the lower portion thereof. The ears 5 of the brackets 4 are drilled and tapped in order to receive the threaded ends of screws 7, which latter are arranged to pass through registering holes in the flanges of the parts 2, 3, and engage the ears 5, for the purpose of firmly holding the parts 2, 3 and 4 in assembly. It will be observed that in this assembly the ears 5 act substantially as nuts for the screws 7, as well as to hold the brackets 4 in an appropriate position.

To the lower flange of the front member 2, there is secured a base plate 8, the union between these two parts being conveniently accomplished by means of rivets 9. This base plate 8 serves as a support for the cards heretofore referred to, having the months of the year printed thereon, and which may be denoted by 10, as well as operating as a point of attachment for a pair of interiorly screw-threaded lugs 11 which are arranged to coincide with a pair of holes through the upper portion of the base 1. These lugs 11 are used as a means of securing the front member 2 to the base 1, through the agency of screws 12 which pass through a washer plate 13 adapted to fit snugly within the bottom of the base 1, which screws 12 are adapted for the customary engagement with the aforesaid interior threads in the lugs 11. The heads of the screws 12 may be countersunk in the washer plate 13, in order that they may be flush therewith, as clearly shown in Fig. 5. It is desirable to make the washer plate 13, from a piece of relatively heavy metal, such for instance, as one-sixteenth inch thick iron or steel, in order that it may give strength to the base and also, by reason of its weight, serve to steady the calendar and resist forces tending to upset the latter.

The calendar also includes a pair of numbered indicator cards, which are circular in form, and may conveniently be composed of sheet celluloid. As they and the inscriptions thereon constitute no part of the present invention, they will not be further described. The means for actuating these indicator cards consists of two sets of similar mechanism, one of which will be described. This mechanism comprises a disk 14, which has a pair of ears 15 disposed opposite each other on the periphery thereof and extending at right angles to the plane of the disk. These ears 15 are adapted to pass through slits in a ratchet wheel 16, which is arranged to rest upon the disk 14, and also through corresponding slits in one of the aforesaid indicator cards, which may be denoted by 17, and then clamped down over the latter in order to unite the said disk, ratchet wheel and indicator card 17. A washer 18 may, if desired, be inserted between the ratchet wheel 16 and the indicator card 17; and a small circular metallic plate 19 may be placed on the other side of the indicator card 17, in order to form a grip for the bent over ends of the ears 15. The assembly just described may be secured in place in the calendar by means of a rivet 20, which passes through the ratchet wheel 16, disk 14 and the back member 3, with its protruding end burred on the outside of the back member 3 in the customary manner.

A double pawl 21 is pivoted in the back member 3, as at 22, and has two noses arranged to engage the teeth of the ratchet wheel 16, as clearly shown in Fig. 5. The teeth of the ratchet wheel 16 are shown in the present instance as triangular, thus making the ratchet wheel of the form commonly known as a star wheel. One end of the pawl 21 is projected in the form of a knob 23, which is arranged to pass through the ends of the front and back members 2, 3, and protrude slightly at the edge of the calendar, in order to facilitate its manual operation. The lower portion of the pawl 21 has an abutment 24 which is designed to be engaged by one end of a spring 25 which is secured within and at the bottom of the back member 3, as clearly shown in Fig. 5.

It will be understood as stated above, that the mechanism just described is arranged in duplicate, as is plainly shown in Fig. 5 of the drawings, and it may be remarked that the spring 25 is of such size and shape as to operate upon both of the corresponding pawls 21. The operation of this part of the calendar may be clearly seen from an examination of Fig. 5, and may be briefly described as follows: When the knob 23 is manually depressed against the tension of the spring 25, the nose of the pawl which is farthest from the knob 23 will engage one of the teeth of the ratchet wheel 16, and thus serve to rotate the latter a short distance in an anti-clockwise direction; during which movement the nose of the pawl just referred to travels from the apex of the tooth engaged to the base thereof. As soon as the knob 23 is released, the tension of the spring will oscillate the pawl in the reverse direction, and its operating nose that is nearest the knob 23, will engage another tooth on the ratchet wheel 16 and continue the rotary movement of the latter until the knob 23 is in the position shown in Fig. 5, at which point it meets the walls of the front and back members 2, 3, and is prevented from going farther. The pawl is retained in this last mentioned position by the spring 25, until it is again manually actuating in repeating the operation above described.

For the purpose of facilitating the rotary movement of the disk 14 and parts secured thereto, the former is provided with an annular beading 14* on its face which is adjacent the rear member 3. This beading 14* serves greatly to reduce the area of frictional contact between the disk 14 and the rear member 3, thereby constituting an effective bearing for the rotary parts.

The front member 2 is provided with a pair of windows 26, in order that the figures on the indicator cards 17 may be observed; which windows are shown as oval in form with their peripheries beveled. These windows are shielded by means of a transparent sheet 27 composed of suitable material, such as celluloid, and this latter is held in position, and at the same time protected, by means of a plate 28 composed of suitable sheet metal. This plate 28 has a hole therethrough adapted to register with the windows 26, and its lower portion is provided with an aperture 29 which is adapted to be engaged by an ear 30 struck upwardly from the bottom flange of the front member 2. In the form shown, the sheet 27 and plate 28 conform in shape to each other, and the former also has a hole therein through which the ear 30 may pass. The engagement between the ear 30 and the sheet 27 is, however, a loose one, so that when the plate 28 is swung away from the front member 2, the said sheet 27 may be removed for the purpose of cleaning. A finger grip 31 may be fashioned in the upper edge of the plate 28 and sheet 27 for convenience in moving them.

It will be seen that, by the construction just described, the plate 28 is virtually hinged in the front member 2 and the sheet 27 removably retained in position between the plate 28 and the member 2, so as to cover the windows 26.

The modified form shown in Fig. 11 is similar to the form already described, except for the following particulars. The base plate 8 is omitted and the front member 2 is secured directly to the upper portion of the base 1, by means of a pair of ears 32 which are struck from the front member 2 and pass through slits in the base 1, within which they are crimped. This fastening is reinforced by a screw 33 which passes through holes in the washer plate 13, and the top of the base 1 and is threaded into the lower flange of the front member 2. A pair of coil springs 34 are provided in place of the single spring 25, one end of the springs 34 being secured to the pawls 21, as at 35, and the other ends to lugs 36 struck up from the lower flanges of the rear member 3. In this form the pawls 21 are not provided with the abutments 24. The operation of the modified form is the same as that already described in connection with the preferred form.

It will be understood that various changes may be resorted to in the form, construction and arrangement of the several parts without departing from the spirit and scope of my invention, and hence I do not intend to be limited to specific features except as they may be set forth in the claims.

What I claim is:

1. In a perpetual calendar, front and back members adapted to fit together, a rotatable disk secured to one of said members, a ratchet wheel having slits therein, ears on the said disk fitted to pass through said slits in the ratchet wheel, and an indicator card provided with slits also adapted to receive said ears, whereby the ears may be passed through the slits in the ratchet wheel and card and clamped down upon the latter for uniting the disk, ratchet wheel and card, and causing the rotation of the ratchet wheel to move the card while the disk acts as a bearing therefor.

2. In a perpetual calendar, front and back members adapted to fit together, a rotatable disk secured to one of said members, a ratchet wheel having slits therein, ears on the said disk fitted to pass through said slits in the ratchet wheel, and an indicator card provided with slits also adapted to receive said ears, whereby the ears may be passed through the slits in the ratchet wheel and card and clamped down upon the latter for uniting the disk, ratchet wheel and card, and causing the rotation of the ratchet wheel to move the card while the disk acts as a bearing therefor, and compound mechanism for rotating the ratchet wheel in one direction, partly automatic and partly manual in its operation.

3. In a perpetual calendar, a front having reading windows therein, a transparent shield for said windows, and means for holding said shield in place, consisting of a plate having an aperture therein adapted to register with the said windows, one end of said plate being hinged to said front.

4. In a perpetual calendar, a front having reading windows therein, a transparent shield for said windows, and means for holding said shield in place, consisting of a plate having an aperture therein adapted to register with said windows, said plate also having a hole at one end thereof, and a lug struck up from the said front and arranged to engage the last mentioned hole in the plate for oscillatably securing the plate in the front.

In testimony, that I claim the foregoing as my invention, I have signed my name in presence of two witnesses, this twenty-fifth day of November, 1914.

ROBERT 'R' DEBACHER'.

Witnesses:
F. GEORGE BARRY,
C. S. SUNDGREN.

Copies of this patent may be obtained for five cents each, by addressing the "Commissioner of Patents, Washington, D. C."